Figure 1:
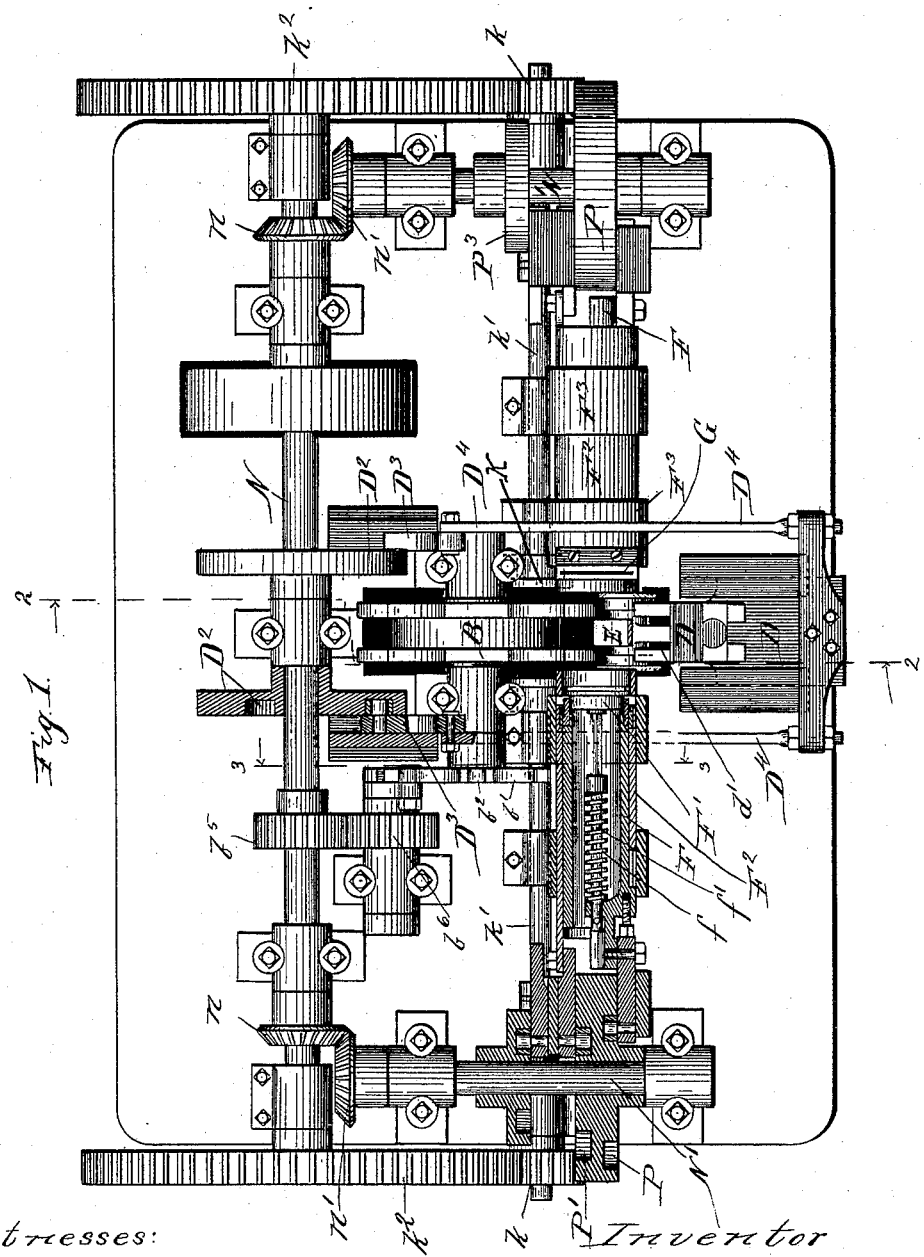

(No Model.) 4 Sheets—Sheet 1.
E. NORTON.
CAN ENDING AND CRIMPING MACHINE.

No. 408,254. Patented Aug. 6, 1889.

Witnesses:
Lew. E. Curtis
H. M. Munday

Inventor
Edwin Norton
By Munday, Evarts and Adcock
Attorneys.

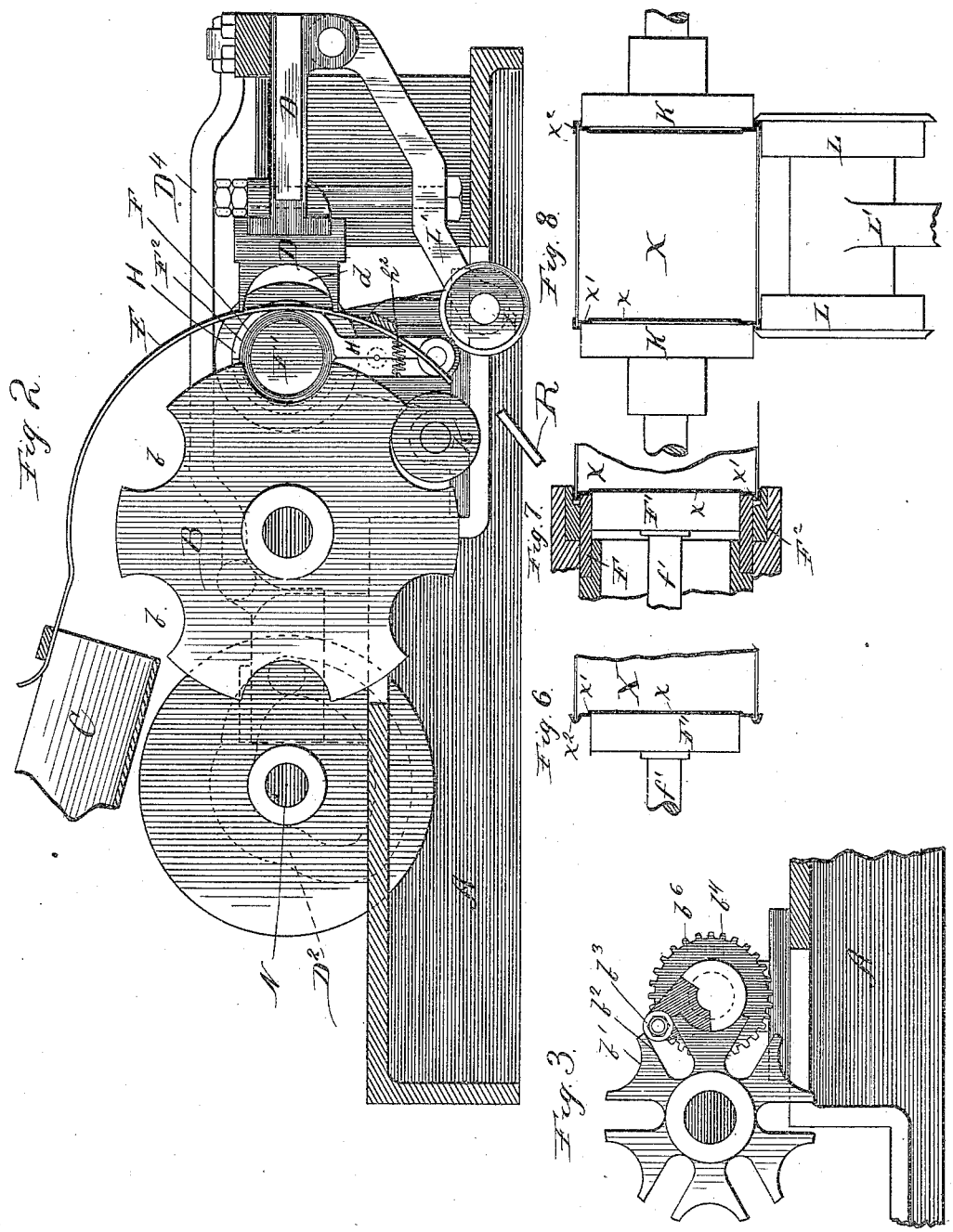

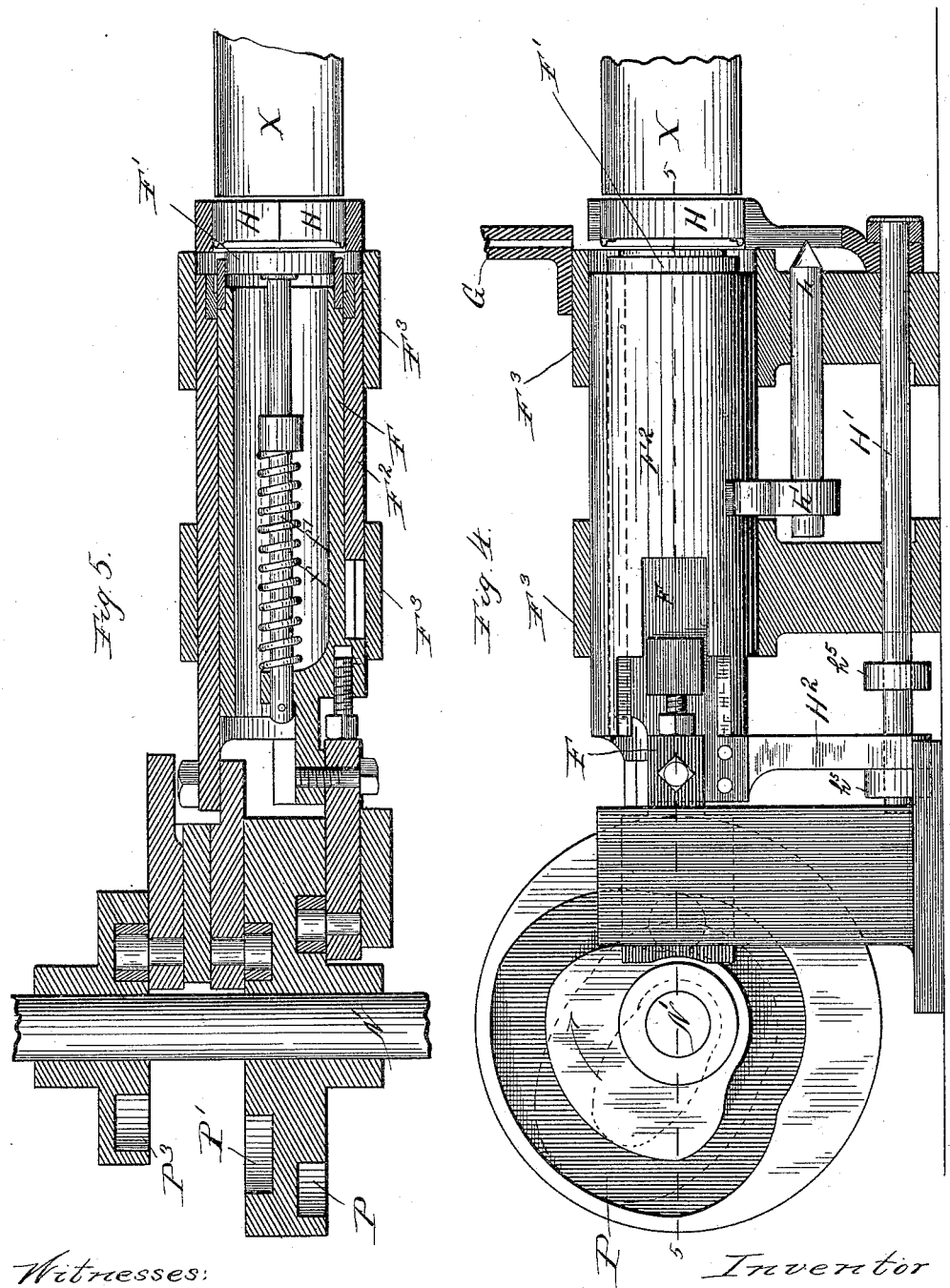

(No Model.) 4 Sheets—Sheet 4.
E. NORTON.
CAN ENDING AND CRIMPING MACHINE.
No. 408,254. Patented Aug. 6, 1889.
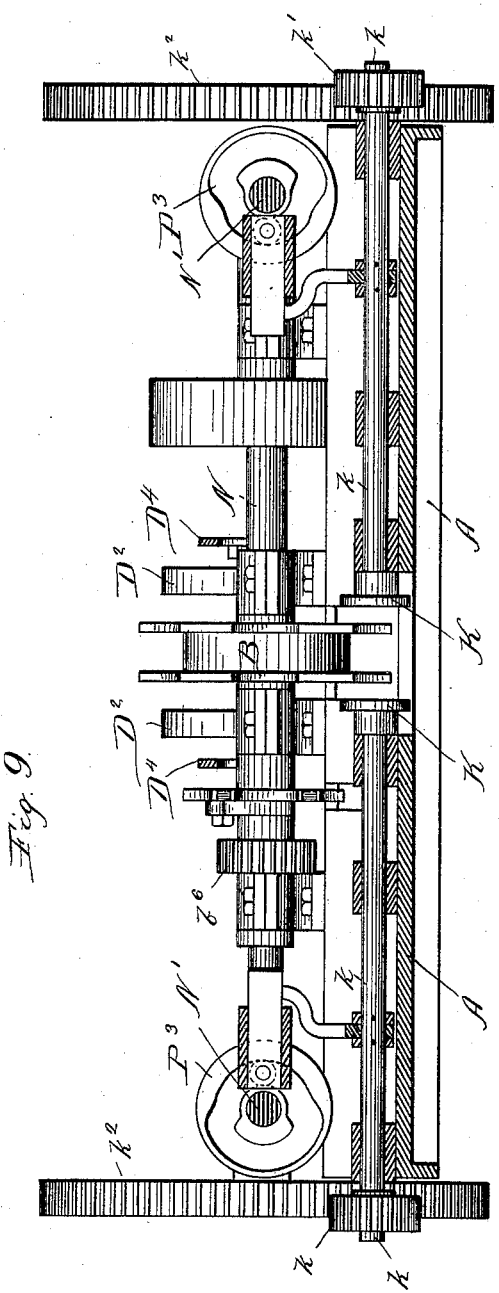

UNITED STATES PATENT OFFICE.

EDWIN NORTON, OF MAYWOOD, ASSIGNOR TO HIMSELF, AND OLIVER W. NORTON, OF CHICAGO, ILLINOIS.

CAN ENDING AND CRIMPING MACHINE.

SPECIFICATION forming part of Letters Patent No. 408,254, dated August 6, 1889.

Application filed October 15, 1888. Serial No. 288,101. (No model.)

*To all whom it may concern:*

Be it known that I, EDWIN NORTON, a citizen of the United States, residing at Maywood, in the county of Cook and State of Illinois, have invented a new and useful Improvement in Combined Can Ending and Crimping Machines, of which the following is a specification.

My invention relates to machines for automatically applying the heads to sheet-metal cans and crimping the same.

My improvement is specially designed for manufacturing cans for use in putting up condensed milk or other like substances, and wherein it is desired that the flange of the head be crimped snugly upon the can-body and thus form a comparatively tight seam before it is soldered, so that but a comparatively small amount of flux or solder will sweat through the seam in the soldering operation.

My invention consists in the novel devices and novel combinations of parts and devices herein shown and described, and more particularly pointed out in the claims.

In the accompanying drawings, which form a part of this specification, and in which similar letters of reference indicate like parts, Figure 1 is a plan view, partly in horizontal section, of a machine embodying my invention. Fig. 2 is a cross-section taken on line 2 2 of Fig. 1. Fig. 3 is a cross-section taken on line 3 3 of Fig. 1. Fig. 4 is an enlarged detail elevation, partly in section, of the heading-plunger mechanism. Fig. 5 is a horizontal longitudinal section taken on line 5 5 of Fig. 4. Figs. 6 and 7 are detail views illustrating the heading mechanism and its operation. Fig. 8 is a detail view showing in elevation the crimping mechanism. Fig. 9 is a detail sectional view showing the sliding and revolving chucks and their connecting parts.

In said drawings, A represents the frame of the machine.

B is the intermittently-revolving can-body feed wheel or turret, having receptacles $b$ to receive the can-bodies one by one from the supply-chute C as the feed-wheel revolves.

D is a reciprocating can-holder slide, having a receptacle $d$ to hold and clamp the can-body in position in the receptacle $b$ of the feed-wheel.

E is a curved guide or guard rim extending around the periphery of the turret B to hold the can-bodies therein, the holder D having a vertical slot $d'$ to receive said guard.

The can-head $x$ is countersunk, as shown at $x'$, and has a flaring flange $x^2$, which fits loosely upon the end of the can-body, as is clearly shown at Fig. 6.

F is a reciprocating plunger, by which the can-head is forced upon the can-body. The plunger F is in the form of a hollow sleeve, and inside the same is a spring holding-plunger F', which serves to prevent the withdrawal of the can-head from the can-body when the plunger F recedes. Surrounding the plunger F is a reciprocating sleeve $F^2$, which serves to bend or squeeze the flaring flange $x^2$ of the can-head somewhat tightly upon the can-body, so that the can-head will not fall off the can-body when the turret B advances to carry the can to the crimping-roller or device.

$F^3$ $F^3$ are the guides on the frame of the machine, in which the sliding sleeve $F^2$ reciprocates. The hollow plunger F reciprocates in the sleeve $F^2$ as a guide, and the spring-actuated holding-plunger F' reciprocates in the sleeve F as a guide. The coil-spring $f$ surrounds the stem $f'$ of the holding-plunger F'.

G is the can-head-supply chute, by which the can-heads are delivered in front of the plungers F and F'.

H H are the two halves of an opening and closing guide-ring, the same being pivoted to the sliding bar or rod H', which is connected to a bracket $H^2$, secured to the sliding plunger F, so that the same will advance with said plunger. This guide-ring is equal in interior diameter to the exterior diameter of the can-head, and is adapted to fit over the can-body as the same is held in position by the can-holding devices B D. To permit the advance of the sleeve $F^2$, which fits outside the can-head, the ring H is made in two opening and closing parts, the same being opened out of the way by a conical pin or wedge $h$, secured to a bracket $h'$ on the reciprocating sleeve $F^2$. A coil-spring $h^2$, connecting the two parts of the ring H H, serves to hold them together, except when they are separated by the pin or wedge $h$. The can-body feeds automatically from the passage or chute C to the carrier B, by which it is moved into position to be clamped and held by the holder-slide D. At the same time the can-head feeds down the chute or passage G into position in front of the plunger F. While the can-body is thus held by the holder B D, the plunger F advances and carries the two-part guide-ring H over the end of the can-body, and the further advance of said plunger F and of the simultaneously-advancing spring-actuated holding-plunger F', operates to force the can-head through the guide-ring H and enter it on the can-body. The still further advance of the plunger F carries the wedge or pin $h$ against the parts of the guide-ring H, and thus opens the guide-ring, so that the outer sleeve $F^2$ may now advance into position to slightly bend, crimp, squeeze, or tighten the can-head upon the can-body. After the can-head has been thus applied to the can-body and squeezed thereon the sleeves F $F^2$ are withdrawn, the spring-plunger F' serving at this time to hold the can-head on the can-body, and the further receding movement of the slide F withdraws the holding-plunger F' from contact with the can-head. After this is done the turret B advances another step and conveys the can to the reciprocating revolving chucks K K, which fit inside the countersink of the can-head and serve to revolve the can in contact with the crimping device L, by which the flange of the can-head is firmly crimped upon the can-body.

The crimping device L may be of any ordinary kind known to those skilled in the art; but it is preferably a revoluble roller or disk, as shown in the drawings.

During the crimping operation the can-body holding and revolving chucks K K serve as mandrels to support and sustain the can body and head against the action of the crimping-rollers. The crimping device L is mounted upon an adjustable arm L', pivotally secured to and carried by the can-holder slide D. The can-holder slide D is reciprocated in its guides by cams $D^2$ on the main driving-shaft N, said cams operating intermediate slides $D^3$, which are connected to the slide D by rods $D^4$. The can-head-applying plunger F is operated by a cam P on the counter-shaft N', and the reciprocating sleeve $F^2$ is operated by a cam P' on said shaft. The can-revolving chucks K are reciprocated by cams $P^3$ on the shafts N', and they are revolved by gears $k$ on their shafts $k'$, said gears $k$ meshing with gears $k^2$ on the driving-shaft N. The counter-shafts N' are driven from the shaft N by bevel-gears $n$ $n'$. The turret B is intermittently revolved by an ordinary Geneva stop-movement $b'$ $b^2$ $b^3$ $b^4$, motion being communicated thereto from the driving-shaft N by the gears $b^5$ $b^6$.

R is the discharge-chute, into which the headed and crimped cans are delivered when they are released by the withdrawal of the can-revolving chucks K K.

I claim—

1. The combination, with a can-body-holding device, of can-head-applying plungers, a pair of reciprocating can-revolving chucks and a pair of crimping rollers or devices, and a can-body carrier for conveying the can from said plungers to said crimping devices, substantially as specified.

2. The combination, with a can-body-heading mechanism, of a reciprocating revolving chuck and an opposing revolving chuck, a crimping roller or device, and a can-body carrier for conveying the can from said heading mechanism to said crimping device, substantially as specified.

3. The combination, with a can-body holder, of a reciprocating hollow heading-plunger, and a follower inside the same for holding the can-head upon the body as the heading-plunger is withdrawn, substantially as specified.

4. The combination, with a can-body holder, of a can-body-heading plunger and a reciprocating sleeve surrounding said plunger, and the rod H', passing through a hole in the bracket $H^2$, in which it fits loosely, the rod H' being provided with collars or shoulders $h^5$ $h^5$, one on each side of the bracket $H^2$, so that the rod H' will be given a more limited movement than the plunger F, to which said bracket $H^2$ is secured for bending or squeezing the flange of the can-head upon the can-body, substantially as specified.

5. The combination, with a can-body holder, of a can-body-heading plunger and a reciprocating sleeve surrounding said plunger for bending or squeezing the flange of the can-head upon the can-body, said heading-plunger being hollow and provided with a follower inside the same for holding the can-head upon the can-body as the heading-plunger and its surrounding sleeve are withdrawn, substantially as specified.

6. The combination, with a can-body holder, of a can-body-heading plunger and a reciprocating sleeve surrounding said plunger for bending or squeezing the flange of the can-head upon the can-body, said heading-plunger being hollow and provided with a follower or holding-plunger inside the same for holding the can-head upon the can-body as the heading-plunger and its surrounding sleeve are withdrawn, and a spring for actuating said holding-plunger, substantially as specified.

7. The combination, with an intermittently-revolving can-body carrying turret B, of a can-holder slide D, a curved guard E, a can-head-applying plunger, a pair of revolving chucks for revolving the can, and a crimping-roller, substantially as specified.

8. The combination, with turret B, of can-holder slide D, heading-plunger F, its surrounding sleeve $F^2$, reciprocating revolving chucks K K, and crimping-rollers L L, substantially as specified.

9. The combination, with turret B, of can-holder slide D, heading-plunger F, its surrounding sleeve F² and its spring-actuated holding-plunger F', reciprocating revolving chucks K K, and crimping-rollers L L, substantially as specified.

10. The combination, with a can-body holder, of a can-head-supply chute, a can-head-applying plunger, and a can-head guide-ring having two opening and closing parts H H, substantially as specified.

11. The combination, with a can-body holder, of a can-head-applying plunger, a reciprocating sleeve surrounding the same, and a guide-ring made in two opening and closing parts to permit said surrounding sleeve to advance, substantially as specified.

12. The combination, with a can-body holder, of plunger F, two-part opening and closing guide-ring H, mounted on a slide connected with said plunger, and reciprocating sleeve F², surrounding said plunger and provided with a pin or wedge for opening the parts of said ring H, substantially as specified.

13. The combination, with a can-body holder, of plunger F, two-part opening and closing guide-ring H, mounted on a slide connected with said plunger, reciprocating sleeve F², surrounding said plunger and provided with a pin or wedge for opening the parts of said ring, and a can-head-supply chute, substantially as specified.

14. The combination, with a can-body holder, of plunger F, two-part opening and closing guide-ring H, mounted on a slide connected with said plunger, reciprocating sleeve F², surrounding said plunger and provided with a pin or wedge for opening the parts of said ring, a can-head-supply chute, a can-body carrier, and a crimping device, substantially as specified.

15. In a can heading and crimping machine, the combination, with a can-body holder, of a heading-plunger, a reciprocating sleeve surrounding said plunger for bending or squeezing the flange of the can-head upon the can-body, a can-body carrier, and means for crimping the seam, substantially as specified.

16. In a can heading and crimping machine, the combination, with means for bending or squeezing the flange of the can-head upon the can-body, and a can-body carrier, of a seam crimping or rolling device, substantially as specified.

17. In a can heading and crimping machine, the combination, with a can-body carrier, of a can-body holder, a heading-plunger, a flange-closing device, and a crimping-roller, substantially as specified.

18. The combination, with a can-carrier, of a can-body holder, a heading-plunger, a flange-closing sleeve surrounding the same, can-revolving chucks, and a crimping-roller, substantially as specified.

19. In a can heading and crimping machine, the combination, with a can-body carrier, of a can-body holder, a heading-plunger, a flange-closing device, a crimping-roller, and reciprocating revolving chucks for revolving the can during the crimping operation, substantially as specified.

EDWIN NORTON.

Witnesses:
H. M. MUNDAY,
L. E. CURTIS.